April 19, 1938.    J. KALSEY    2,114,714
STROBOSCOPIC SYNCHROMETER
Filed April 18, 1936    3 Sheets-Sheet 1

INVENTOR.
John Kalsey.
BY
Chas. E. Townsend.
ATTORNEY.

INVENTOR.
John Kalsey.
BY
Chas. E. Townsend.
ATTORNEY.

April 19, 1938.   J. KALSEY   2,114,714
STROBOSCOPIC SYNCHROMETER
Filed April 18, 1936   3 Sheets-Sheet 3

INVENTOR.
John Kalsey.
BY
Chas. E. Townsend.
ATTORNEY.

Patented Apr. 19, 1938

2,114,714

UNITED STATES PATENT OFFICE 2,114,714

STROBOSCOPIC SYNCHROMETER

John Kalsey, North Palo Alto, Calif.

Application April 18, 1936, Serial No. 75,159

18 Claims. (Cl. 172—245)

This invention relates to apparatus for determining the phase relationship between two alternating current power systems, or between different portions of the same system, and for determining various phenomena pertaining to polyphase circuits; the present application being a continuation in part of my application entitled "Stroboscopic synchrometer" filed July 1, 1935, Serial Number 29,313, now abandoned.

Among the objects of this invention are: To provide an apparatus which will show at all times the phase relationship between two alternating current circuits of the same or slightly different frequency; to provide an apparatus which will show a phase succession in a single polyphase circuit; to provide an apparatus which will show phase sequence or rotation in polyphase circuits; to provide an apparatus which will show synchronism as between two alternating systems or the rate of slip if these systems be out of synchronism; to provide means of determining the proper polarity for connecting two systems which are in synchronism, i. e., of determining whether these systems be substantially in phase or substantially of opposite phase; to provide means for visually indicating and measuring the angular difference in phase in degrees between two currents; to provide means for "phasing out" a single or polyphase generator; to provide means for testing motors and generators operating on alternating current circuits, for instance, for magnetic defects, balance, overload condition, slippage, etc.; to provide means for automatically bringing the motors and the stroboscopic discs into proper indicating position when connected to an alternating current system without manual adjustments; and to provide a suitable system of switching which will enable all of these tests or any of them to be made successively, quickly, and accurately.

My invention possesses numerous other objects and features of advantage, some of which, together with the foregoing, will be set forth in the following description of specific apparatus embodying and utilizing my novel method. It is therefore to be understood that my method is applicable to other apparatus; and that I do not limit myself, in any way, to the apparatus of the present application, as I may adopt various other apparatus embodiments, utilizing the method, within the scope of the appended claims.

The apparatus of my invention operates upon the stroboscopic principle. Considered broadly, it comprises a pair of synchronous motors, each driven by the circuits to be compared. Each of the two motors drives a stroboscopic disc, the two discs being so positioned that one is viewed by means of the other. Preferably this is accomplished by making the shafts of the two motors concentric, and mounting one of the two stroboscopic discs immediately behind the other. Each of the two discs is provided with a slot which is arranged to be illuminated, the slots thus being visible only when in registry. The two discs are driven in opposite directions, and means are provided for causing the motors to lock into step always in the same phase. Since the discs rotate in opposite directions, the slot will come into registry twice per revolution of each motor, and the angle of this registry will be a constant for any given phase angle of the driving circuit. It is convenient to use two motors to drive the synchroscope. The automatic phase means mentioned above always brings the motors into synchronism in proper relation, but there is an indeterminency of 180° in the phase indication given. To remove this indeterminency a two-pole glow lamp is provided, and an additional aperture is provided in one of the two stroboscopic discs through which this glow lamp is viewed. Such lamps are characterized by the fact that only the positive pole glows, and by connecting the glow lamp to one circuit and driving the stroboscope disc which contains the aperture through which the lamp is viewed, from the same or other circuit, the lamp will be occluded at all times except for a single instant of the cycle, and the polarity of the indication is determined by determining which of the two poles of the lamp is glowing during the instant at which the lamp is used. As in all stroboscopic devices, the indications are discontinuous, but follow each other in such close succession that a sense of continuity of indication is given to the observer.

Referring to the drawings.

Figure 1:
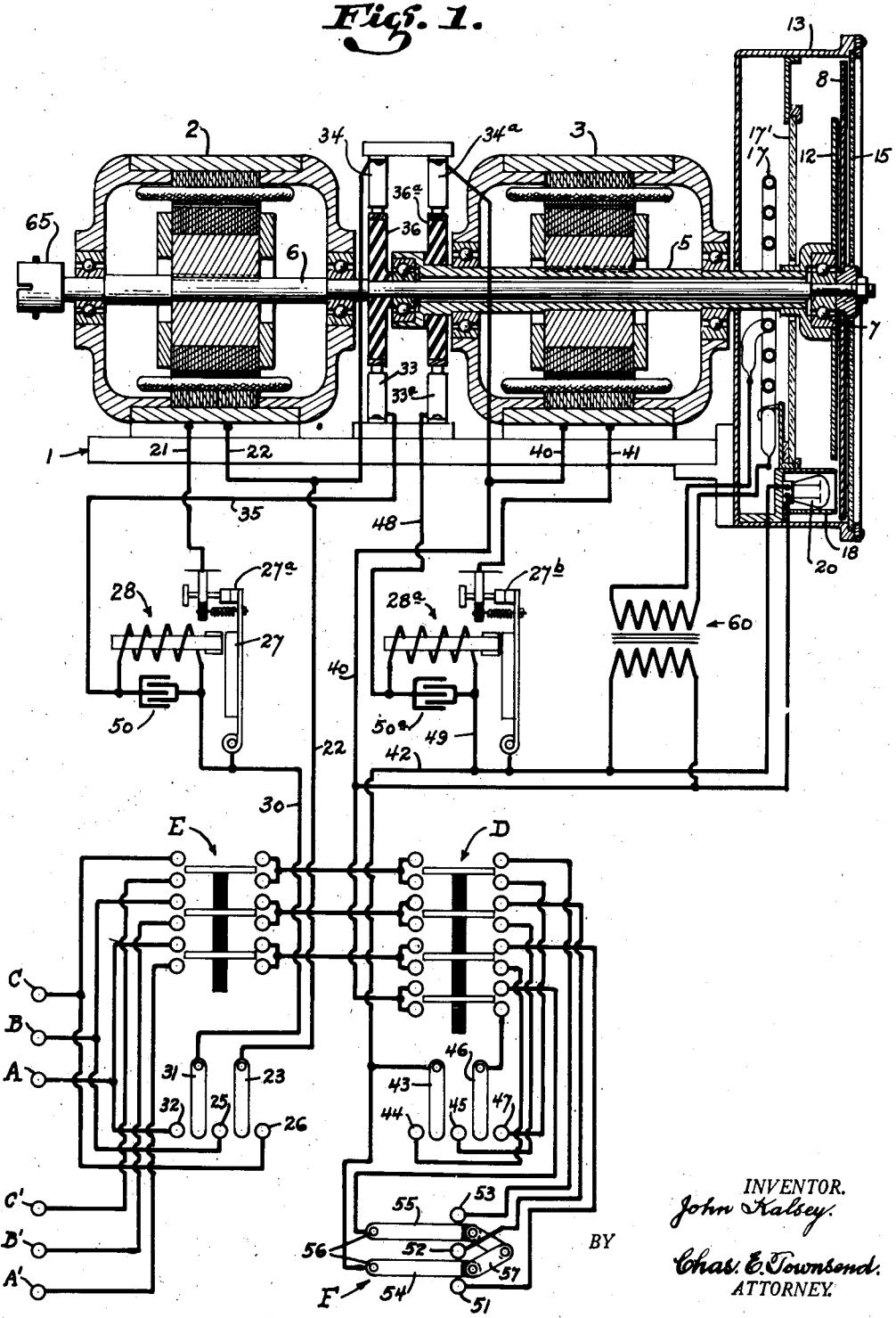
Fig. 1 is a diagram of the entire system, partly in elevation, partly in vertical section, and partly schematic.

Considering the invention in more detailed terms, a frame 1 is provided on which are mounted two coaxial single phase synchronous motors 2 and 3. The shaft 5 of the motor 3 is in the form of a hollow sleeve, within and through which runs a solid shaft 6 of the motor 2. Each of the shafts is preferably carried on ball or other anti-friction bearings, one of which (between the two shafts on the end carrying the stroboscopic disc) is shown at 7.

Mounted on the end of the shaft 6 is a stroboscopic disc 8. This disc is made as light as possible. It may be of aluminum or one of the light alloys, or it may be made of some light transparent material such as one of the transparent synthetic resins or even celluloid or glass, although glass is undesirable because of its fragility and celluloid because of its tendency to warp. The latter difficulty, however, is not as serious as might be supposed since the centrifugal force tends to hold it flat when in operation.

Figure 4:
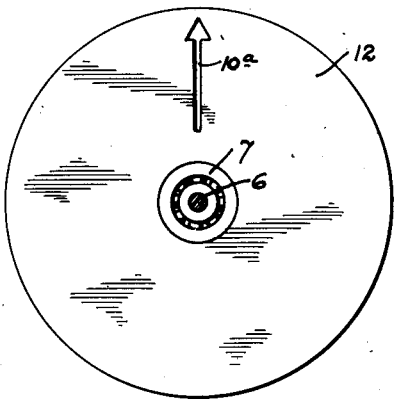
Fig. 4 is a front view of the smaller stroboscopic disc driven by the motor 3.
Figure 3:
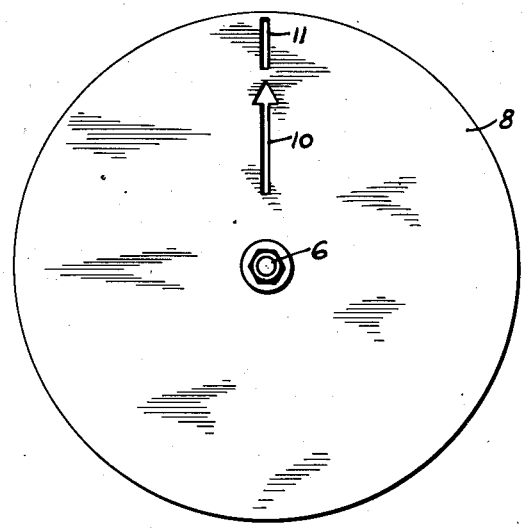
Fig. 3 is a front view of the larger stroboscopic disc which is driven by the motor 2.

The disc 8 is provided with two apertures 10 and 11 (Fig. 3) one in the form of an arrow and the other in the form of a slot. If an opaque disc is used these apertures are cut from the material in suitable manner. If a transparent disc be used, all of the disc except the apertures are rendered opaque by paint or lacquer. The shaft 5 carries a similar but smaller disc 12, (see Fig. 4). This disc has a single aperture 10$^a$ exactly similar in size and shape to the aperture 10 in disc 8.

Figure 2:
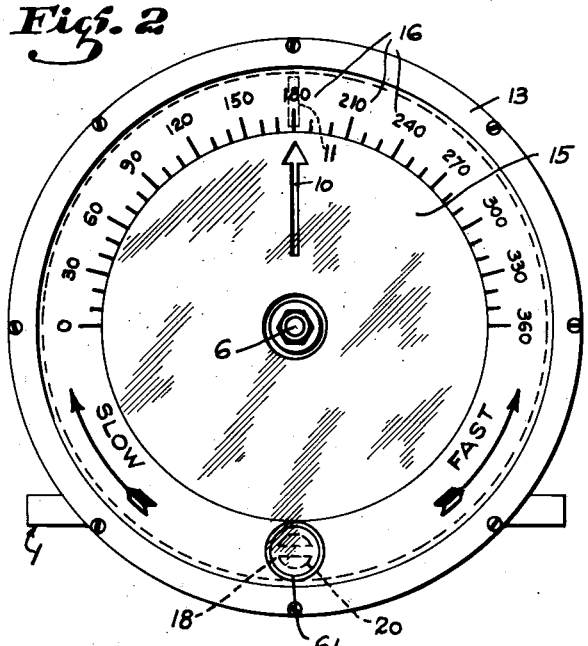
Fig. 2 is a front elevation of the dial on which the indication is given.

Surrounding the discs is an opaque housing 13 having a transparent window 15. On this window are inscribed graduations 16 (Fig. 2). A suitable source of illumination is mounted within the housing behind the discs. In the drawings this is typified by a neon tube 17 of spiral form. It is desirable, however, that the light from the tube should be fairly diffused within the housing, so that the apertures formed in the discs will be illuminated at all points. For this purpose, I utilize a ground glass 17' as a diffuser.

Positioned within a shield 18 inside the housing is a bipolar glow lamp 20, filled with neon or other rare gas. The housing 18 is so positioned that the lamp 20 may be viewed through the aperture 11 in the disc 8.

Each of the two motors 2 and 3 is substantially similar, and is a single phase self-starting synchronous motor. The motor 2 is connected to the leads indicated at 21 and 22. The lead 22 connects to a two-way switch 23, which can be engaged with either contact 25 or 26, and thus connect one side of the motor to either terminal B or terminal C of a circuit which will hereinafter be referred to as the load circuit. Lead 21 connects through the armature 27 of a polarized relay 28 to a lead 30, which in turn connects to a two-way switch 31. This switch will contact either contact 25 or contact 32, thus connecting the other side of the motor either to terminal B or to terminal A. The three terminals, A, B and C are connected to three leads of a three-phase line comprising the load circuit, and by manipulating the switches 23 and 31 the motor may be connected across either the phase A—B, A—C, or B—C.

One end of the winding of the relay 28 is connected to the lead 30. The other end is connected through a lead 35 to a brush 33 of a rectifying commutator 36 mounted on the shaft of the motor 2, the other brush 34 being connected to the lead 22. The commutator closes a circuit through the coil 28 during one half of each cycle.

Figure 5:
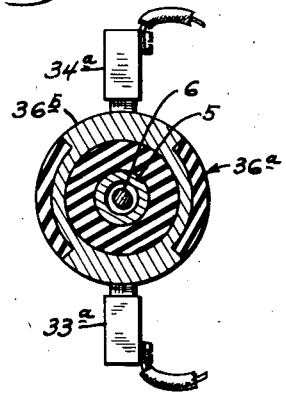
Fig. 5 is a diagrammatic cross section of one of the current rectifying commutators.

The commutator, as shown in Fig. 5, has two connected conductive segments 36$^b$, the conducting segments being so positioned as to always maintain a fixed position with relation to the rotor of the motor 2, this position being such that the conductive segments will align with the brushes 33$^a$ and 34$^a$ only when the positive side of an alternating current wave is passing through, thus rectifying the current and permitting only positive direct current to flow through the coil 28 of the relay, as will hereinafter appear.

The armature 27 of the relay is a permanent magnet and as such is attracted to the core of the relay 28 so as to normally maintain the contacts shown at 27$^a$ closed. If a positive current is passed through the coil of the relay the contacts will remain closed. On the other hand, if negative current passes through the coil the polarity of the relay will be reversed and the permanent magnet or armature 27 will be repelled and the circuit through the motor will be broken.

When the motor 2 is started by closing a circuit through the wires 21 and 22, the motor and the commutator 36 will rotate in unison and if it happens that the conductive segments of the commutator align with the brushes 33 and 34, the relay will remain inactive and the circuit maintained by the relay through the contacts 27$^a$ will become permanent and the motor will lock in step with the positive side of the alternating current wave. On the other hand, if the circuit through the motor should happen to be closed at a time when the negative side of the current wave is passing through, the rotor and the commutator will start to rotate but the polarity of the relay will be reversed and the armature would be repelled, thus breaking the circuit through the contacts 27$^a$. This would cause the motor to slow down until the conductive segments come into register with the positive side of the alternating current wave when the polarity of the relay will again be reversed and the armature will be attracted and the circuit through the contacts 27$^a$ will be permanently closed.

The construction of the electro-magnet and the initial tension of the permanently magnetized armature against its core is such as to make the relay unresponsive to an irregular alternating current which will pass through its windings at the time the motor is started, and can only become operative when the current passing through the same becomes of a more uni-directional character. This inoperative condition is assisted by the fact that the motors are so constructed as to attain full speed within the space of ±1/60 of one second.

A similar or identical relay is generally indicated at 28$^a$ and an identical rectifying commutator 36$^a$ is employed in connection with the motor 3. The motor 2 will hereinafter be referred to as the master motor and the motor 3 as the test motor. This motor will, in most instances, be driven by the circuit to be tested. This circuit is indicated by the reference numerals A', B' and C'. However, this motor may also be actuated by the circuit A, B, C in conjunction with the master motor. The lead wires from the motor 3 are indicated at 40 and 41. The lead wire 41 passes through the contacts 27$^b$ of the relay indicated at 28$^a$. It then passes through the armature of said relay and wire 42 which is connected with a switch arm 43. This arm operates between a pair of contacts 44 and 45 and these are connected to a switch generally indicated at D, which, in turn, is connected with a switch indicated at E, said switch being capable of connecting the switch D with either the load circuit or the circuit to be tested. Lead 40 of the motor 3 is connected with switch D and through said switch with a switch arm 46 which operates between a pair of contacts 45 and 47. The wires from the contacts 44, 45 and 47 pass through the switches D and E and are capable of being connected through the switch E, either with the circuit to be tested or the load circuit indicated by the terminals A, B and C. The current to be rectified and to be used by the relay 28ª passes through the lead wire 40 to the brush 34ª, then through the conducting segments of the commutator, then through brush 33ª and wire 48 through the coil of the relay and out through wire 49 which connects with wire 42. A condenser 50 is bridged across the coil 28 and a similar condenser 50ª is bridged across the coil 28ª, the action of the condensers making the relays more positive.

It is important in the operation of the apparatus or instrument here disclosed that the two stroboscopic discs driven by the respective motors assume fixed positions with relation to each other when in operation so that the slots formed therein will cross each other at certain positions within the range of the scale indicated at 16; that is, the slots 10 and 10ª should always cross each other at some point within the range of the scale when both motors are locked into step with either the top or bottom half of the alternating current wave energizing the motors. To accomplish this the selective current rectifying commutators and the cooperating polarized relays are employed and as both of the relays will only operate or maintain the contacts 27ª and 27ᵇ closed when positive current passes through the respective coils it will be understood that both motors will be locked in step when the respective circuits are closed and that they will lock in step on the positive side of the alternating current wave passing therethrough.

The switches, indicated at E and D, are multicontact switches. For instance, by referring to switch E it will be noted that the contacts are arranged in pairs, the upper of each pair being connected with the terminals A, B and C of the load circuit and the lower one of each pair being connected with the terminals A', B' and C' of the circuit to be tested; hence by moving the switch E upwardly the blades of the switch will engage the upper contacts and the current supplied to the motor 3 will be derived from the load circuit. On the other hand, if the switch E is moved to its lower position the blades will engage the lower contacts and as these are connected with the terminals A', B' and C' of the circuit to be tested the current to the motor 3 will be supplied from that circuit. The switches, indicated at 31 and 23, make it possible to select any one of the terminals A, B and C of the load circuit when the motor 2 is to be operated. The switches 43 and 46 make it possible to select any one of the terminals A', B' and C' when the motor 3 is to be operated. The switch D is similar in construction to the switch E, that is, the contacts are arranged in pairs. The lower contacts are connected with the terminals 44, 45 and 47 of the switches 43 and 46, while the upper contacts are connected with the terminals 51, 52 and 53 of a switch F, which is utilized for certain types of tests, as will hereinafter appear. This switch, by the way, consists of two arms 54 and 55 pivoted as at 56, the forward ends are connected by a pair of toggle links 57 which are connected by a spring which normally maintains the arms 54 and 55 in parallelism. By grasping the forward end of the toggle link 57 and swinging the end one way or another arms 54 and 55 will contact either the contacts 53 and 52, or the contacts 52 and 51. On the other hand, by merely applying pressure to the ends of the toggle links 57 the arms 54 and 55 will spread apart and will engage the contacts 51 and 53. The spacing between the arms 54 and 55 and the contacts 51 and 52 and 53 is very small, this spacing being purposely so that the switch F can be quickly operated to close the circuit between any pair of the three contacts that may be selected as will hereinafter appear.

When the apparatus or instrument is in actual use it can be seen that inasmuch as the position of the stroboscopic discs is fixed with relation to the rotors of the motors 2 and 3 that they will be governed by the phase of the circuits to which the motors 2 and 3 are connected. Any change in relative frequency and any change in phase will cause a change in the relative positions of the two discs so that the registry point of the slots formed in the respective discs will move circumferentially, or in other words it will cause the line of vision or line of light projecting through the two slots when they register, to assume different angular positions on the dial, and as the scale 16 is calibrated in degrees of phase the instrument can be employed for measuring change in frequency, change in phase, differences in phase and many other phenomena which will hereinafter be referred to.

The current for the neon lamp 17 is taken from the secondary side of a transformer indicated at 60, the primary side of the transformer being supplied with current from the wires 40 and 42; the same wires also supplying current to the lamp 20 and inasmuch as the wires 40 and 42 may be supplied with current either from the load circuit or the circuit to be tested, both lamps may be operated from one circuit or another.

As already pointed out the apparatus or instrument has many uses, a few of which will now be described. First of all, let it be assumed that the instrument is located in a power house or electric generating station having one or more generators in operation and that it is desired to install a new generator. Also, let it be understood that the system is a three-phase alternating current system. If that is the case, the operation of properly connecting the new generator so that it may be hooked onto the system is known as "phasing out" and is accomplished as follows.

Phasing out

Motor 2 of the instrument, which will now be referred to as the master motor, will be connected to the terminals A and B of the load line of the system so as to be supplied with current therefrom. The three wires from the new generator are next connected with the terminals A', B' and C' of the test circuit so that current therefrom may be supplied to the test motor 3. To close the circuit through the master motor switches 31 and 23 are closed by swinging them to the left into engagement with the contacts 32 and 25. When this is accomplished the motor starts operating and is automatically locked in step with the load circuit by means of the commutator 36 and the cooperating relay 28. Switches 43 and 46 controlling the circuit through the test motor 3 are next closed by swinging them to the left into engagement with the contacts 44 and 45. When this circuit is closed, and if switch E assumes its lowermost position, the test motor will be operated on current supplied by the new generator through the terminals A' and B' and the test motor will be automatically locked in step and with the positive side of the current wave by means of the commutator 36ª and the cooperating relay 28ª. With the circuits closed through the master motor and the test motor the stroboscopic discs will rotate in opposite directions, the lamps 17 and 20 will be lighted and if the connections A' and B' are correct the line of vision or arrow appearing upon the dial will point to zero of the scale 16. If the wires are incorrectly connected the arrow will assume some angular position between zero and 360°, showing that the two currents are not in phase and the operator will thus be given a visual indication that the wires are not correctly connected. He may next try the terminals 45 and 47 by throwing the switch arms 43 and 46 to the right and still find that the arrow is not pointing to zero, then if he connects the arms 43 and 46 with the terminals 44 and 47 the arrow is bound to point to zero. That means that the wires connected with the terminals A' and C' should be reversed. The next step in "phasing out" the new generator is to determine if the correct polarity exists between the two systems. This is accomplished by first raising the switch E so that the switch blades will connect with the upper terminals, as by doing so lamp 20 will be operated from the load circuit. When a circuit has been established through the lamp 20 one terminal or another will glow and this will be seen through the slit 11 as it passes by the window 61 formed in the dial. Let it be assumed that the upper terminal is glowing. If that is the case, the operator will know that the polarity is positive as the master motor is locked in step with the positive side of the alternating current wave of the load circuit. The operator will next move the switch E to its lowermost position so that the blades contact the lower terminals. In doing so, he immediately connects lamp 20 with the circuit to be tested and if the same terminal of the lamp 20 glows the operator will know that the polarity of the two circuits coincides. On the other hand, if they do not coincide it is only necessary to reverse the wires A' and B' when the polarity will be corrected.

*Phase rotation*

It is sometimes desirable to know the proper rotation or phase sequence in polyphase circuits. The instrument forming the subject matter of this application can determine phase rotation and it is accomplished as follows.

By connecting the circuit to be tested through the terminals A, B and C of the load circuit to the switch F and the switches 31 and 23, both the master motor and the test motor can be made to operate on any phase of the particular polyphase circuit to be tested. The master motor 2, however, is for purposes of description arranged to always operate between the terminals A and B. Now, by moving the switch F to engage the terminals 52 and 53 or 51 and 53, or 51 and 52 the arrow will assume different locations on the dial. The speed with which the arrow moves across the dial or changes its position is governed by the speed with which the switch F is brought into play. It is for this reason that a switch which may be quickly operated is employed.

Assuming that the switch F is connected with the terminals 51 and 52, it is possible that the indicating arrow will move in a clockwise direction from its original position. This would indicate that the circuit established through the contacts 51 and 52 is ahead in phase with relation to the circuit established through the contacts 52 and 53. If, now the switch is swung to engage the contacts 51 and 53, the arrow may move in an anti-clockwise direction. This would indicate that the circuit established through the contacts 51 and 53 is behind in phase with relation to the circuit established through the contacts 52 and 53. By this means proper phase rotation of the particular circuit being tested can be rapidly and accurately determined.

The instrument can be utilized for the purpose of indicating inherent defects in generators, such as improper separation of magnets, or improper spacing of magnets, or various other conditions effecting the synchronous condition of phase relationship. Any such error would be visually indicated on the dial, as either the arrow would indicate an irregular angular difference, or it would not remain stationary as it would tend to vibrate when such conditions exist.

Figure 6:
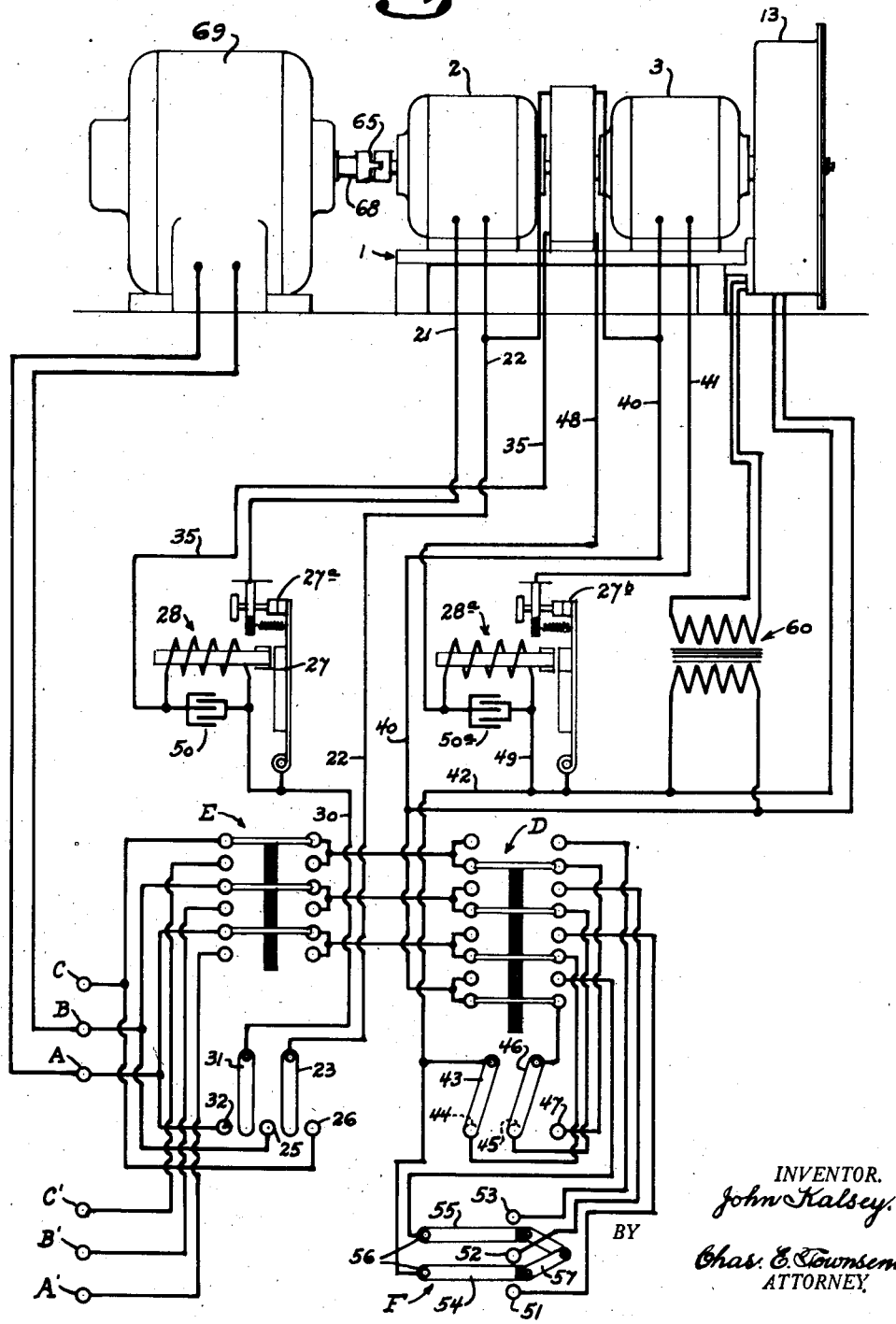
Figure 6 is a view similar to Figure 1, but showing in addition thereto a third motor to be tested, and also showing the wiring connections required.

The coupling, indicated at 65, is used for testing a motor or generator for slip, for mechanical balance, or for other conditions. For instance, a motor may be so overloaded as to be retarded or might be unbalanced to such an extent as to be "hunting". To make a test of a motor of this character the shaft 6 of the motor 2 would be coupled through means of the coupling 65 to the shaft 68 of the motor 69 or generator to be tested (see Figure 6) and would be driven thereby the circuit to motor 2 being open, while motor 3 would be driven from the same current source A—B as the motor or generator being tested. Any irregular condition of the machine under test would be indicated by the position of the arrow on the dial. If it stands still it would indicate true ratio synchronism of the machine on the test.

Assuming that both motors 2 and 3 are energized by the current which also energizes the machine on the test and the arrow position on the dial is noted, if the motor 2 is disconnected from the line and connected to the machine being tested and driven thereby, if that machine is overloaded the arrow will assume a new position on the dial. The variation of the new position from the original position would indicate the amount of overload. Again, if the arrow vibrates, it would indicate an unbalanced condition of the machine undergoing test as compared to the current supplying the machine.

As another illustration of the use of the instrument, let it be supposed that the master motor 2 is connected with a main power station and that the test motor 3 is connected with an auxiliary power station and that at some period during the day the load on the main line becomes so heavy that it is decided to throw in the auxiliary station. In that event before the generator of the auxiliary station is thrown in it becomes necessary for the operator to bring the generator up to synchronous speed and also to phase and polarity. Synchronous speed phase and polarity are indicated when the arrow stands still on the dial and points to zero, but if it assumes any other position it is out of phase and polarity. This, however, may be corrected by the operator either increasing or decreasing the speed of the generator in the auxiliary station until the arrow assumes zero position when the auxiliary generator may be thrown in.

Other uses of the instrument could be described for determining various phenomena in polyphase circuits but it is believed that the uses already mentioned should suffice, and while certain features of the invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. In an apparatus of the character described a pair of synchronous alternating current motors connected to separate sources of alternating current supply, means for connecting and operating both motors from one source of current supply, means for connecting one motor with one source and the second motor with the other source of current supply, means for automatically synchronizing and locking the respective motors in step whether operated from one source or separate sources of current supply, and a pair of concentrically positioned slotted stroboscopic discs disposed one in front of the other, said discs being fixed to and driven by the respective motors in opposite directions.

2. In an apparatus of the character described a pair of synchronous alternating current motors connected to separate sources of alternating current supply, means for connecting and operating both motors from one source of current supply, means for connecting one motor with one source and the second motor with the other source of current supply, means for automatically synchronizing and locking the respective motors in step whether operated from one source or separate sources of current supply, a pair of concentrically positioned slotted stroboscopic discs disposed one in front of the other, said discs being fixed to and driven by the respective motors in opposite directions, and means behind the discs for projecting light through the slotted discs when the slots cross each other.

3. In an apparatus of the character described a pair of synchronous alternating current motors connected to separate sources of alternating current supply, means for connecting and operating both motors from one source of current supply, means for connecting one motor with one source and the second motor with the other source of current supply, means for automatically synchronizing and locking the respective motors in step whether operated from one source or separate sources of current supply, a pair of concentrically positioned slotted stroboscopic discs disposed one in front of the other, said discs being fixed to and driven by the respective motors in opposite directions, a two-pole glow lamp disposed behind one of the discs, said disc having a second slot formed therein through which the poles of the lamp can be viewed, and means for selectively connecting said lamp with either source of current supply.

4. In an apparatus of the character described a pair of synchronous alternating current single phase motors, two separate sources of multi-phase alternating current supply, means for connecting and operating one motor on any selected phase of one source of current supply, means for connecting and operating the second motor on any selected phase of the second source of current supply, and a pair of concentrically positioned slotted stroboscopic discs disposed one in front of the other, said discs assuming fixed positions with relation to the respective motors and being driven by the motors in opposite directions.

5. In an apparatus of the character described a pair of synchronous alternating current single phase motors, two separate sources of multi-phase alternating current supply, means for connecting and operating one motor on any selected phase of one source of current supply, means for connecting and operating the second motor on any selected phase of the second source of current supply, a pair of concentrically positioned slotted stroboscopic discs disposed one in front of the other, said discs assuming fixed positions with relation to the respective motors and being driven by the motors in opposite directions, and means cooperating with the stroboscopic discs for determining any angular difference in the selected phases by which the respective motors are driven.

6. In an apparatus of the character described a pair of synchronous alternating current single phase motors, two separate sources of multi-phase alternating current supply, means for connecting and operating one motor on any selected phase of one source of current supply, means for connecting and operating the second motor on any selected phase of the second source of current supply, a pair of concentrically positioned slotted stroboscopic discs disposed one in front of the other, said discs assuming fixed positions with relation to the respective motors and being driven by the motors in opposite directions, and means cooperating with the stroboscopic discs for determining difference in polarity between the selected phases by which the respective motors are driven.

7. In an apparatus of the character described a pair of synchronous alternating current single phase motors, two separate sources of multi-phase alternating current supply, means for connecting and operating one motor on any selected phase of one source of current supply, means for connecting and operating the second motor on any selected phase of the second source of current supply, a pair of concentrically positioned slotted stroboscopic discs disposed one in front of the other, said discs assuming fixed positions with relation to the respective motors and being driven by the motors in opposite directions, means cooperating with the stroboscopic discs for determining any angular difference in the selected phases by which the respective motors are driven, and other means for determining any difference in polarity between the selected phases.

8. In an apparatus of the character described a pair of synchronous alternating current single phase motors, two separate sources of multi-phase alternating current supply, means for connecting and operating one motor on any selected phase of one source of current supply, means for connecting and operating the second motor on any selected phase of the second source of current supply, a pair of concentrically positioned slotted stroboscopic discs disposed one in front of the other, said discs assuming fixed positions with relation to the respective motors and being driven by the motors in opposite directions, and means for rapidly switching from one phase to another in said second source of current supply to determine phase rotation in said second source of current supply.

9. In combination with a pair of alternating current circuits, a pair of coaxial discs, means for rotating each of said discs in synchronism with the alternations in one of said circuits, and in opposite directions, means for indicating the angular registration of predetermined points on each disc, and means for determining upon which half cycle registration occurs.

10. In combination with a pair of alternating current circuits, a synchronous motor connected in each of said circuits, a disc driven by each motor, said discs being coaxially mounted, and rotatable by said motors in opposite directions, each disc having an opening therein, said openings being positioned to register during rotation, means for directing light through said openings when registered, a rotating rectifier attached to each of said motors, and a motor switch operated by current through said rectifiers to start said motors in predetermined directions.

11. In combination with a pair of alternating current circuits, a synchronous motor connected in each of said circuits, a disc driven by each motor, said discs being coaxially mounted, and rotatable by said motors in opposite directions, each disc having an opening therein, said openings being positioned to register during rotation, means for directing light through said openings when registered, and a polarity indicating lamp operated by current supplying cne of said motors, and viewed through an opening in the disc driven by the other motor.

12. In combination with a pair of alternating current circuits, a synchronous motor connected in each of said circuits, a disc driven by each motor, said discs being coaxially mounted, and rotatable by said motors in opposite directions, each disc having an opening therein, said openings being positioned to register during rotation, means for directing light through said openings when registered, and a two-pole glow lamp connected in the circuit energizing one of said motors and positioned to be viewed through an opening in the disc driven by the other motor.

13. In combination with a pair of alternating current circuits, a synchronous motor connected in each of said circuits, a disc driven by each motor, said discs being coaxially mounted, and rotatable by said motors in opposite directions, each disc having an opening therein, said openings being positioned to register during rotation, means for directing light through said openings when registered, and automatic means operated by said motors to start said motors in predetermined directions.

14. An apparatus for measuring phase difference in two alternating current circuits comprising a pair of coaxial discs, means for rotating the discs in synchronism with the alternations in each circuit and in opposite directions, means for indicating the angle of registration of a fixed point on each disc, and means for indicating the half cycle upon which registration occurs.

15. An apparatus for measuring phase difference in two alternating current circuits comprising a pair of coaxial discs, means for rotating the discs in synchronism with the alternations in each circuit and in opposite directions, means for indicating the angle of registration of a fixed point on each disc, and means for simultaneously indicating the polarity of the half cycle upon which registration occurs.

16. In an apparatus of the character described a pair of synchronous alternating current motors connected to separate sources of alternating current supply, means for connecting and operating both motors from one source of current supply, means for connecting one motor with one source and the second motor with the other source of current supply, means for automatically synchronizing and locking the respective motors in step whether operated from one source or separate sources of current supply, a pair of concentrically positioned slotted stroboscopic discs disposed one in front of the other, said discs being fixed to and driven by the respective motors in opposite directions, a third motor, means for connecting and driving said third motor from one of the sources of current supply and mechanical coupling means for driving one of the first-named motors from the third motor.

17. In an apparatus of the character described a pair of synchronous alternating current motors, two separate sources of alternating current supply, means for connecting and operating one motor from one source of current supply and the second motor from the second source of supply, a third motor adapted to be driven from the first source of current supply, mechanical coupling means for driving the first motor by means of the third motor, and a pair of concentrically positioned stroboscopic discs disposed one in front of the other, said discs being fixed to and driven by the first and second named motors.

18. In an apparatus of the character described, a first and a second synchronous alternating current motor, a source of alternating current supply, means for connecting and operating the second motor from the source of current supply, a third motor adapted to be connected and driven from the same source of current supply, mechanical coupling means for driving the first motor by means of the third motor, and a pair of concentrically positioned stroboscopic discs disposed one in front of the other, said discs being fixed to and driven by the first and second named motors.

JOHN KALSEY.